United States Patent
Berne

(10) Patent No.: US 12,065,080 B2
(45) Date of Patent: Aug. 20, 2024

(54) SIDE CLEARANCE DEVICE, ASSEMBLY AND VEHICLE COMPRISING SUCH SIDE CLEARANCE DEVICE AND METHOD FOR MANOEUVRING SUCH VEHICLE

(71) Applicant: Volvo Truck Corporation, Gothenburg (SE)

(72) Inventor: Nicolas Berne, Heyrieux (FR)

(73) Assignee: Volvo Truck Corporation, Gothenburg (SE)

( * ) Notice: Subject to any disclaimer, the term of this patent is extended or adjusted under 35 U.S.C. 154(b) by 679 days.

(21) Appl. No.: 17/292,207

(22) PCT Filed: Nov. 12, 2018

(86) PCT No.: PCT/EP2018/080931
§ 371 (c)(1),
(2) Date: May 7, 2021

(87) PCT Pub. No.: WO2020/098903
PCT Pub. Date: May 22, 2020

(65) Prior Publication Data
US 2021/0402925 A1   Dec. 30, 2021

(51) Int. Cl.
*B60R 1/26* (2022.01)

(52) U.S. Cl.
CPC .......... *B60R 1/26* (2022.01); *B60R 2300/202* (2013.01); *B60R 2300/8066* (2013.01)

(58) Field of Classification Search
CPC combination set(s) only.
See application file for complete search history.

(56) References Cited

U.S. PATENT DOCUMENTS

| 4,679,158 A * | 7/1987 | Tate ...................... B60R 1/025 |
| | | 250/224 |
| 2002/0048094 A1* | 4/2002 | Witt ....................... B60R 1/02 |
| | | 359/872 |

(Continued)

FOREIGN PATENT DOCUMENTS

| CN | 201941672 U | 8/2011 |
| CN | 103204102 A | 7/2013 |

(Continued)

OTHER PUBLICATIONS

International Search Report and Written Opinion for PCT/EP2018/080931, mailed Apr. 9, 2019, 10 pages.

(Continued)

*Primary Examiner* — Daniel Chang
(74) *Attorney, Agent, or Firm* — Withrow & Terranova, PLLC

(57) ABSTRACT

Vehicle (1) comprising:—a driver compartment (4) with driving seat (8),—a door pivotally mounted on a lateral frame along a door swept, the door comprising a lateral window,—a viewing system (25) comprising a wing (28) comprising a first end (28a) mounted on the lateral frame (19) and a second end (28b), and at least one camera (26) mounted on the wing (28) so as to acquire a lateral rear view of the vehicle (1),—a side clearance device (35) comprising a deflector (37) presenting an extended configuration in which said deflector (37) is directly visible from the driving seat (8) through the lateral window so as to enable a driver (9) to locate the second end (28b) of the wing (28), the deflector (37) being movable between the extended configuration and a retracted configuration in which the deflector (37) is arranged outside of the door swept.

22 Claims, 8 Drawing Sheets

(56) References Cited

U.S. PATENT DOCUMENTS

| | | | |
|---|---|---|---|
| 2003/0090570 A1 | 5/2003 | Takagi et al. | |
| 2011/0127793 A1* | 6/2011 | Gwon | B60R 7/02 |
| | | | 296/37.8 |
| 2012/0092781 A1 | 4/2012 | Sap | |
| 2016/0243988 A1* | 8/2016 | Peterson | B60R 1/0617 |
| 2019/0031199 A1* | 1/2019 | Dudar | B60K 11/085 |
| 2020/0324834 A1* | 10/2020 | Kelly | B62D 35/02 |

FOREIGN PATENT DOCUMENTS

| | | | | |
|---|---|---|---|---|
| DE | 102011113323 A1 | 5/2012 | | |
| EP | 2441621 A1 | 4/2012 | | |
| WO | WO-2017178859 A1 * | 10/2017 | | B60R 1/00 |
| WO | 2018146094 A1 | 8/2018 | | |

OTHER PUBLICATIONS

First Office Action for Chinese Patent Application No. 201880098752.2, mailed Aug. 3, 2023, 16 pages.

* cited by examiner

SIDE CLEARANCE DEVICE, ASSEMBLY AND VEHICLE COMPRISING SUCH SIDE CLEARANCE DEVICE AND METHOD FOR MANOEUVRING SUCH VEHICLE

TECHNICAL FIELD OF THE DISCLOSURE

The invention relates to a side clearance device, an assembly and a vehicle comprising such side clearance device and to a method for manoeuvring such vehicle.

BACKGROUND OF THE DISCLOSURE

A viewing system is used in a vehicle to provide a driver installed on a driving seat of a driver compartment of the vehicle with one or several views of vehicle surroundings. The views comprise at least one or several lateral rear views of the vehicle surroundings arranged rearward and at a side of the driving seat.

Mirrors have long been used in the viewing system for imaging of the vehicle surroundings. Especially, the viewing system has implemented one or several side mirrors, each mounted outward the driver compartment on a vehicle side, to provide lateral rear views.

When manoeuvring the vehicle, and especially a large vehicle such as a truck, a bus or other, apart from their primary function of providing lateral rear views, the side mirrors of the viewing system can also serve a secondary function of side clearance device, according to which they help the driver to estimate the distance between the vehicle side and obstacles of the vehicle surroundings.

Currently, mirrors are progressively replaced by viewing systems comprising cameras connected to at least one display. To provide the lateral rear view, the viewing system comprises a wing protruding outwardly from a vehicle and more precisely from a lateral frame of the vehicle side, and at least one camera mounted on the wing.

To enable the driver to locate a second end of the wing opposite a first end mounted on the lateral frame and hence to avoid damaging the wing, it is known especially from US 2016/0375829 to implement a deflector mounted on the wing in an extended configuration in which it is directly visible from the driving seat through the lateral window of a door pivotally mounted on the lateral frame. However, to avoid collision with the door, the deflector has to be arranged outside a door swept of the door between an open position and a closed position, resulting either in a cumbersome side clearance device with a deflector far away from the vehicle side or in a door having a limited door swept.

Another solution to avoid damaging the wing is known from WO 2017/178859 where the wing itself is movable between the extended configuration in which the second end of the wing is directly visible from the driving seat through the lateral window of the door, and a retracted position, in which the second end of the wing is arranged outside of the door swept. However, the wing in the retracted configuration prevents the driver from checking for oncoming vehicles when opening the door.

The invention aims to solve the above mentioned problems.

SUMMARY OF THE DISCLOSURE

For this purpose, in a first aspect, the invention provides a vehicle comprising:

- a driver compartment extending along a longitudinal direction with a driving seat for a driver,
- two vehicle sides delimiting the driver compartment in a transverse direction, at least one of the vehicle sides comprising a lateral frame,
- a door pivotally mounted on the lateral frame along a door swept between an open position and a closed position, said door comprising a lateral window,
- a viewing system configured to image vehicle surroundings, said viewing system comprising:
  - a wing configured to protrude outwardly from the lateral frame, said wing comprising a first end mounted on the lateral frame and a second end opposite to the first end, and
  - at least one camera mounted on the wing so as to acquire a lateral rear view of the vehicle;
- a side clearance device comprising a support mounted on the lateral frame at a distance from the vehicle side, and a deflector mounted on the support and presenting an extended configuration in which said deflector is directly visible from the driving seat through the lateral window so as to enable the driver to locate the second end of the wing, the vehicle being characterized in that the deflector is movable with respect to the support between the extended configuration and a retracted configuration in which the deflector is arranged outside of the door swept.

Hence, the invention proposes a side clearance device in which only the deflector is movable with respect to the wing of the viewing system, leaving a field of view of the camera unchanged. The side clearance device can then be preserved from damages upon opening the door while enabling the driver to exit safely.

The support may be arranged at the second end of the wing.

The side clearance device may further comprise:
- an actuator configured to move the deflector, and
- an electronic control unit configured to control the actuator.

According to these provisions, the actuator moving the sole deflector can be reduced in size and better responsive as compared to an actuator moving the whole wing.

The electronic control unit may comprise a switch arranged inside the driver compartment so as to be actuated by the driver to move the deflector in one of the extended and retracted configuration.

The electronic control unit may be configured to detect at least one of an exiting situation in which the driver exits the driver compartment and an entering situation in which the driver enters the driver compartment, the electronic control unit being configured to control the actuator so as to:
- move the deflector from the extended configuration to the retracted configuration upon detection of the exiting situation, before the door has reached the open position,
- move the deflector from the retracted configuration to the extended configuration upon detection of the entering situation, after the door has been moved from the open position.

The electronic control unit may be configured to detect a position of the door in the door swept between the open position and the closed position, the electronic control unit controlling the actuator so as to move the deflector based on detection of a triggering position reached by the door with respect to the deflector.

The door may further comprise a door handle that can be actuated by the driver to move the door from the closed position to the open position, the electronic control unit controlling the actuator so as to move the deflector based on detection of actuation of the door handle.

The viewing system may further comprise a display placed in the driver compartment and configured to display the lateral rear view acquired by the camera, and the electronic control unit may be further configured to enable turn on the display upon detection of the exiting situation.

The electronic control unit may be configured to detect vehicle speed and to control the actuator so as to place the deflector in the refracted configuration when the vehicle speed is above a vehicle speed retraction threshold. Thanks to these provisions, vehicle drag can be decreased and hence fuel consumption can be reduced.

The electronic control unit may be configured to control the actuator so as to place the deflector in the extended configuration when the vehicle speed is below a vehicle speed extension threshold The deflector may be pivotally movable about at least one pivot axis, said pivot axis being one of:
substantially parallel to the longitudinal direction, and
substantially parallel to the transverse direction.

Alternatively, the deflector may be movable along a translation path belonging to a plane substantially normal to the longitudinal direction.

The side clearance device may be configured so that the deflector covers at least partly the camera in the retracted configuration.

The lateral frame may comprise a roof part above a lateral access closed by the door in the closed position, the wing and the deflector being mounted on the roof part.

According to a second aspect, the invention provides a method for manoeuvring a vehicle as defined previously, comprising moving a deflector of a side clearance device with respect to a support of the side clearance device mounted on a lateral frame of the vehicle at a distance from a vehicle side, the deflector moving between an extended configuration in which said deflector is directly visible from a driving seat of a driver compartment through a lateral window of a door pivotally mounted on the lateral frame so as to enable the driver to locate the second end of the wing, and a retracted configuration in which the deflector is arranged outside of a door swept of the door between an open position and a closed position.

The method may comprise moving the deflector in one of the extended and retracted configuration upon actuation of a switch arranged inside the driver compartment by the driver.

The method may comprise detecting at least one of an exiting situation in which the driver exits the driver compartment and an entering situation in which the driver enters the driver compartment, and at least one of:
moving the deflector from the extended configuration to the retracted configuration upon detection of the exiting situation, before the door has reached the open position,
moving the deflector from the retracted configuration to the extended configuration upon detection of the entering situation, after the door has been moved from the open position.

The method may comprise detecting a position of the door in the door swept between the open position and the closed position and moving the deflector based on detection of a triggering position reached by the door with respect to the deflector.

When the door further comprises a door handle that can be actuated by the driver to move the door from the closed position to the open position, the method may comprise moving the deflector based on detection of actuation of the door handle.

When the viewing system further comprises a display placed in the driver compartment and configured to display the lateral rear view acquired by the camera, the method may comprise turning on the display upon detection of the exiting situation.

The method may comprise detecting vehicle speed and placing the deflector in the retracted configuration when the vehicle speed is above a vehicle speed retraction threshold.

The method may comprise placing the deflector in the extended configuration when the vehicle speed is below a vehicle speed extension threshold.

According to a third aspect, the invention provides a side clearance device for a vehicle as defined previously, comprising a support intended to be mounted on a lateral frame of the vehicle at a distance from a vehicle side, and a deflector mounted on the support and movable with respect to the support between an extended configuration in which said deflector is intended to be directly visible from a driving seat of a driver compartment through a lateral window of a door pivotally mounted on the lateral frame so as to enable the driver to locate a second end of a wing of a viewing system, and a retracted configuration in which the deflector is intended to be arranged outside of a door swept of the door between an open position and a closed position.

According to a fourth aspect, the invention provides an assembly comprising a side clearance device as defined previously and a wing configured to protrude outwardly from the lateral frame, said wing comprising a first end mounted on the lateral frame and a second end opposite to the first end, the support being arranged at the second end of the wing.

The assembly may further comprise at least a camera mounted on the wing and intended to acquire a lateral rear view of the vehicle.

BRIEF DESCRIPTION OF THE FIGURES

Other objects and advantages of the invention will emerge from the following disclosure of particular embodiments of the invention given as non-limitative example, the disclosure being made in reference to the enclosed drawings in which.

DETAILED DESCRIPTION OF THE INVENTION

Figure 1:
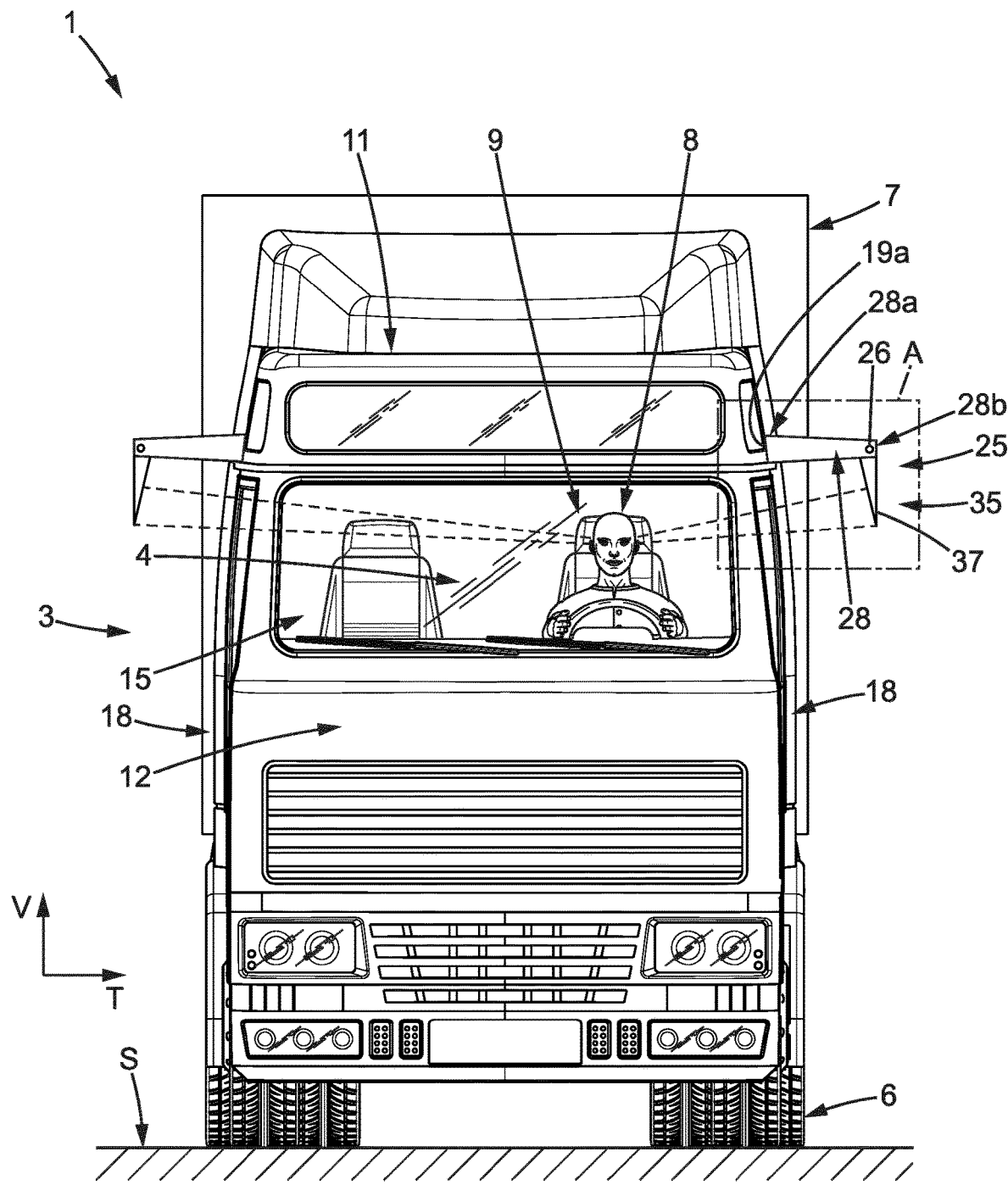
FIG. 1 is a representation of a front view of a vehicle comprising a viewing system and a side clearance device according to a first embodiment of the invention, the viewing system comprising a camera mounted on a wing so as to acquire a lateral rear view of the vehicle, the side clearance device comprising a deflector mounted on a support arranged at a second end of the wing at a distance from the vehicle side, the deflector being in an extended configuration in which it is directly visible from the driving seat through the lateral window so as to enable the driver to locate the second end of the wing, the deflector being pivotally movable between the extended and retracted configurations about a pivot axis substantially parallel to a transverse direction of the vehicle.

In the figures, the same reference numbers refer to the same or similar elements.

FIGS. 1, 2, 3a, 3b, 4a and 4b represent a vehicle 1 according to a first embodiment of the invention. In the represented first embodiment, although not limited thereto, the vehicle 1 is a tractor of a truck comprising a driver cab 3 and a chassis 5 adjoining the driver cab 3 in a longitudinal direction L corresponding to a direction along which the vehicle 1 moves forward or rearward on a ground surface S. The driver cab 3 and the chassis 5 are mounted on wheels 6 driven by a motor system. In the figures, a trailer 7 is mounted on the chassis 5.

The driver cab 3 defines a driver compartment 4 oriented along the longitudinal direction L with a with a driving seat 8 where a driver 9 may seat.

The driver cab 3 comprises:
a floor and a roof 11 delimiting the driver compartment 4 in a vertical direction V perpendicular to the ground surface S and to the longitudinal direction L,
opposite front 12 and back 13 faces delimiting the driver compartment 4 in the longitudinal direction L, the front wall 12 being provided with a windshield 15 on an upper part, close to the roof 11, and
two opposite vehicle sides 18 delimiting the driver compartment 4 in a transverse direction T perpendicular to the longitudinal L and vertical V directions.

Each of the vehicle sides 18 comprises a lateral frame 19 defining a lateral access to the driver compartment 4 along the transverse direction T. A door 20 is pivotally mounted to the lateral frame 19 about an axis substantially parallel to the vertical direction V between a closed position, shown in FIGS. 1 and 3a and in which the door 20 closes the lateral access, and an open position, shown in FIGS. 2 and 3b and in which the door 20 releases the lateral access. The open and closed positions define a door swept B represented in FIG. 3b. As shown in FIG. 2, the door 20 comprises a lateral window 21 arranged to provide the driver 9 with a direct view of lateral surroundings of the vehicle 1, and a door handle 22 that can be actuated by the driver 9 to move the door 20 from the closed position to the open position.

Figure 4A:
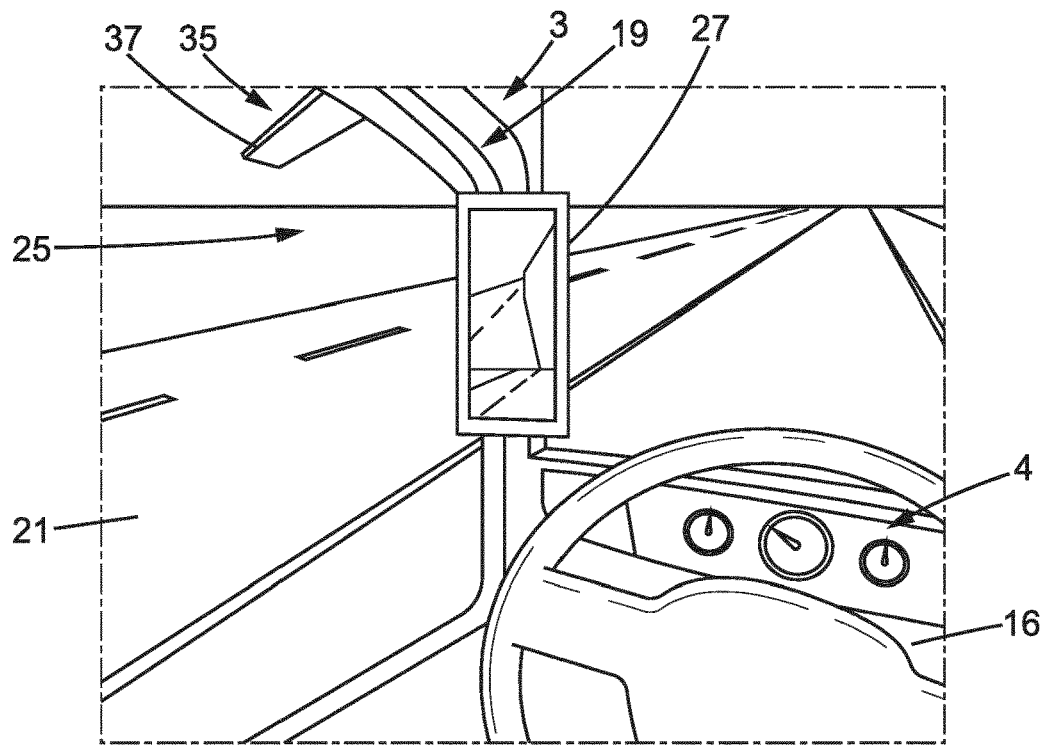
FIGS. 4a and 4b are representations of a view of a driver seated on a driving seat of a driver compartment of the vehicle of FIG. 1, the deflector being respectively in the extended and retracted configurations.
Figure 4B:
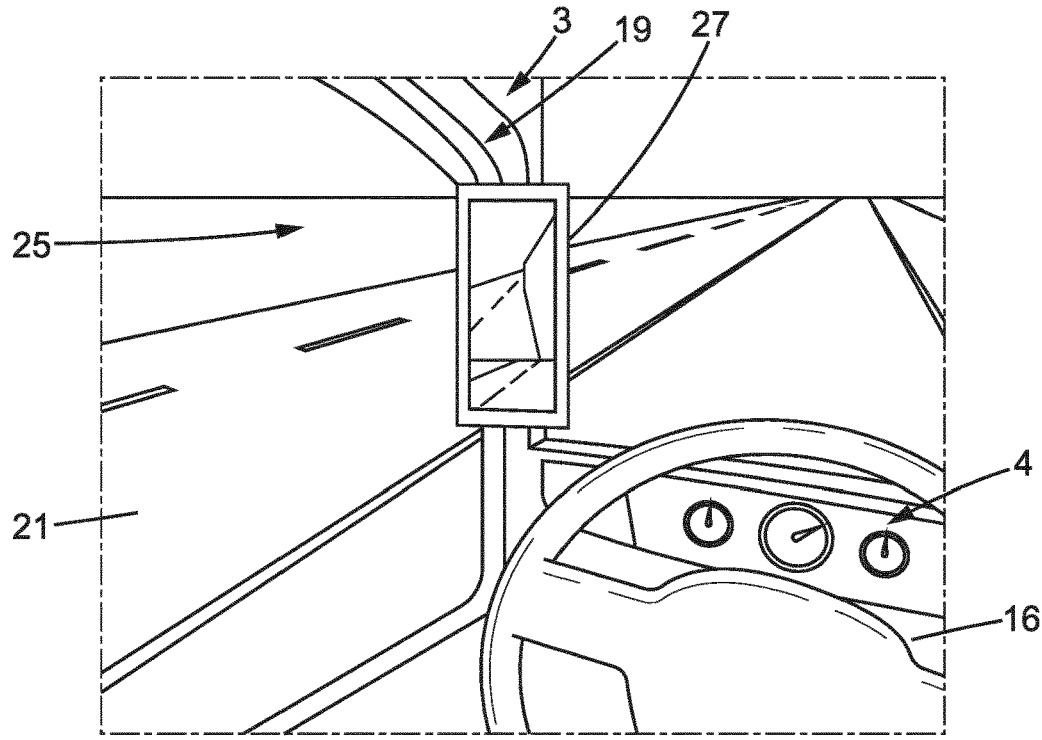

The vehicle 1 comprises a viewing system 25 configured to provide the driver 9 installed on the driving seat 8 with one or several views of surroundings of the vehicle 1. The viewing system 25 comprises one or several cameras 26 mounted on the vehicle 1 so as to acquire any of the appropriate views, and at least one display 27 arranged within the driver compartment 4 as shown in FIGS. 4a and 4b and connected to the cameras 26 so as to display any of the views acquired by the cameras 26 or any suitable combination of views.

As shown in the figures, the viewing system 25 is especially configured to provide a lateral rear view of the surroundings arranged rearward and at a side of the driving seat 8. To that end, the viewing system 25 comprises a wing 28 configured to protrude outwardly with respect to the driver compartment 4. The wing 28 has a first end 28a mounted on a roof part 19a above the lateral access of the lateral frame, and a second end 28b opposite the first end 28a. One of the cameras 26 is then mounted on the wing 28 so as to acquire the lateral rear view of the vehicle 1 so that it may be displayed on the display 27.

The vehicle 1 is also equipped with a side clearance device 35 that is used as a visual reference for the driver 9 when manoeuvring the vehicle 1 to estimate a distance between the vehicle side 18 and obstacles of the surroundings and more advantageously to locate the second end 28b of the wing 28 and therefore estimate a distance between the second end 28b of the wing 28 and obstacles of the surroundings.

The side clearance device 35 comprises a support 36 mounted on the lateral frame 19 of the vehicle 1 at a distance from the vehicle side 18, and a deflector 37 mounted on the support 36. In the represented first embodiment, the support 36 is arranged at the second end 28b of the wing 28 and is, for example, formed by an end wall of the wing 28.

Figure 2:
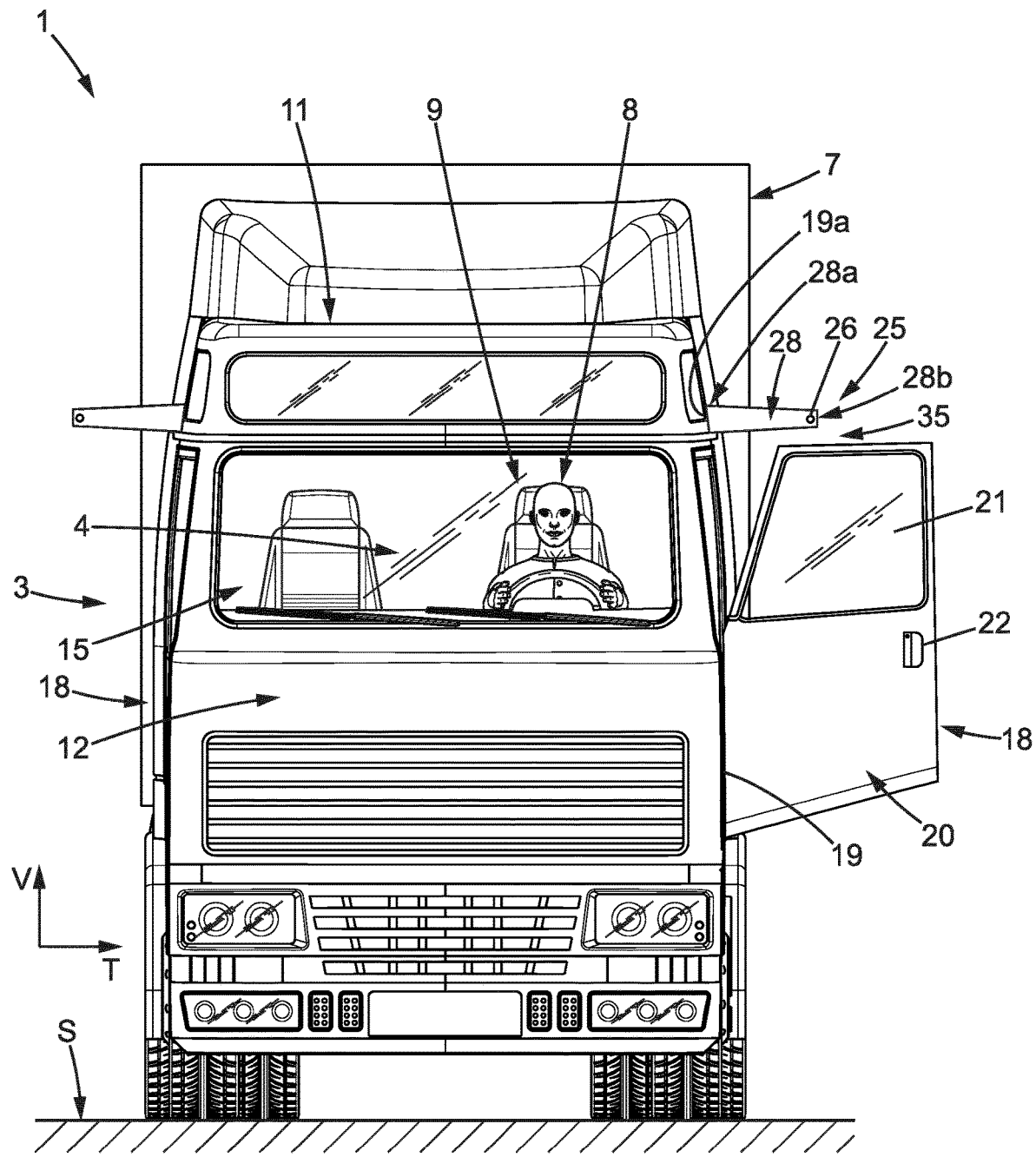
FIG. 2 is a representation of the front face of the vehicle of FIG. 1, the deflector being moved with respect to the support to a refracted configuration in which it is arranged outside of the door swept.
Figure 3A:
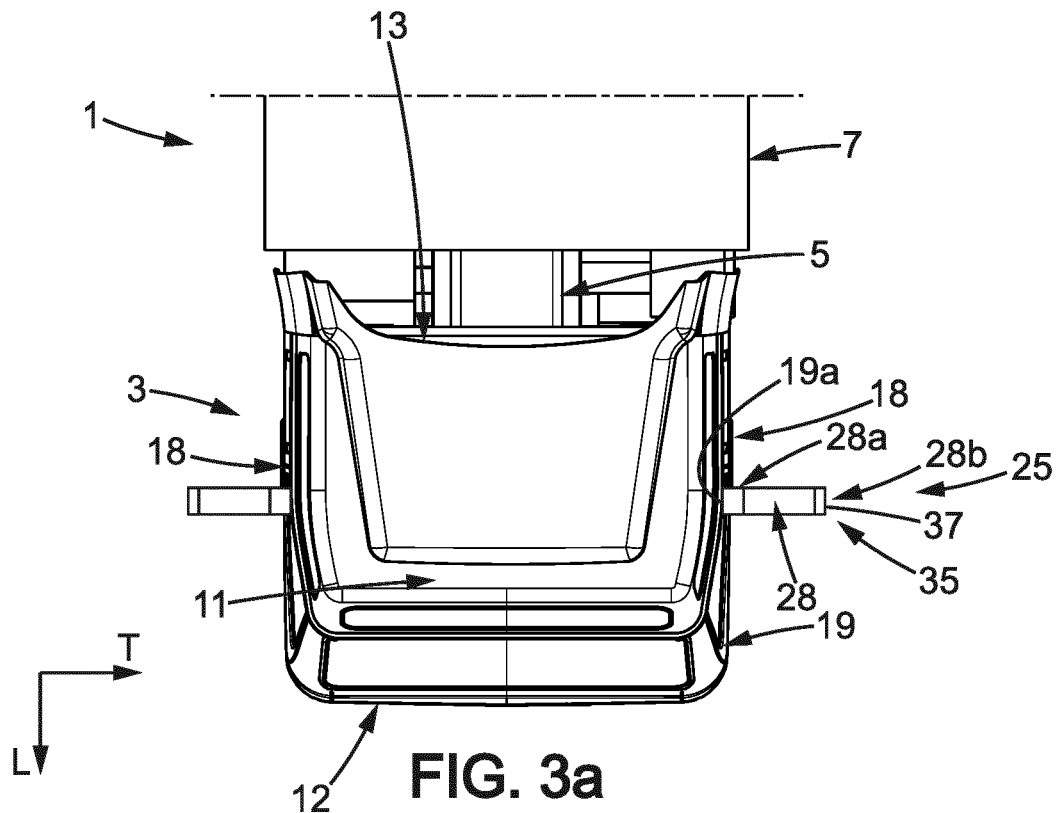
FIGS. 3a and 3b are representations of a top view of the vehicle of FIG. 1, the deflector being respectively in the extended and retracted configurations.
Figure 3B:
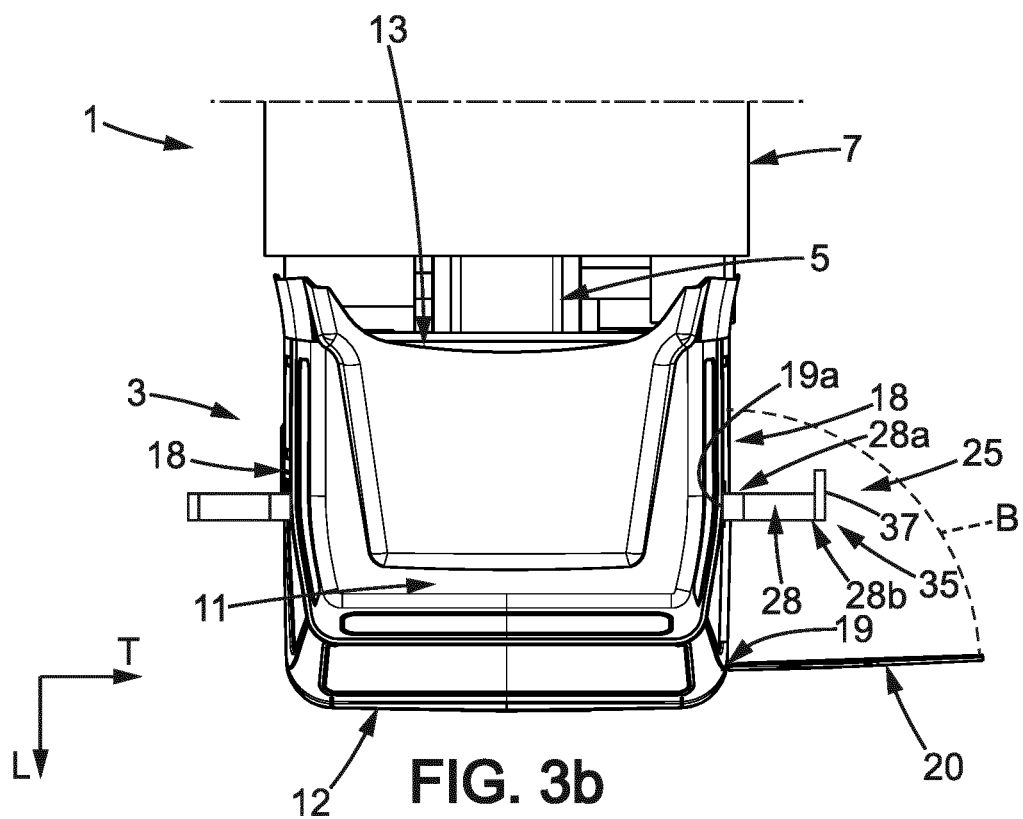

As shown in FIGS. 1, 3a and 4a, the deflector 37 presents an extended configuration, in which it is directly visible by the driver 9 from the driving seat 8 through the lateral window 21. As shown in FIGS. 2, 3b and 4b, to avoid any interference with the door 20, the deflector 37 is movable with respect to the wing 28 between the extended position and a retracted configuration in which it is spaced apart from the extended configuration to be arranged outside of the door swept B.

Figure 5:
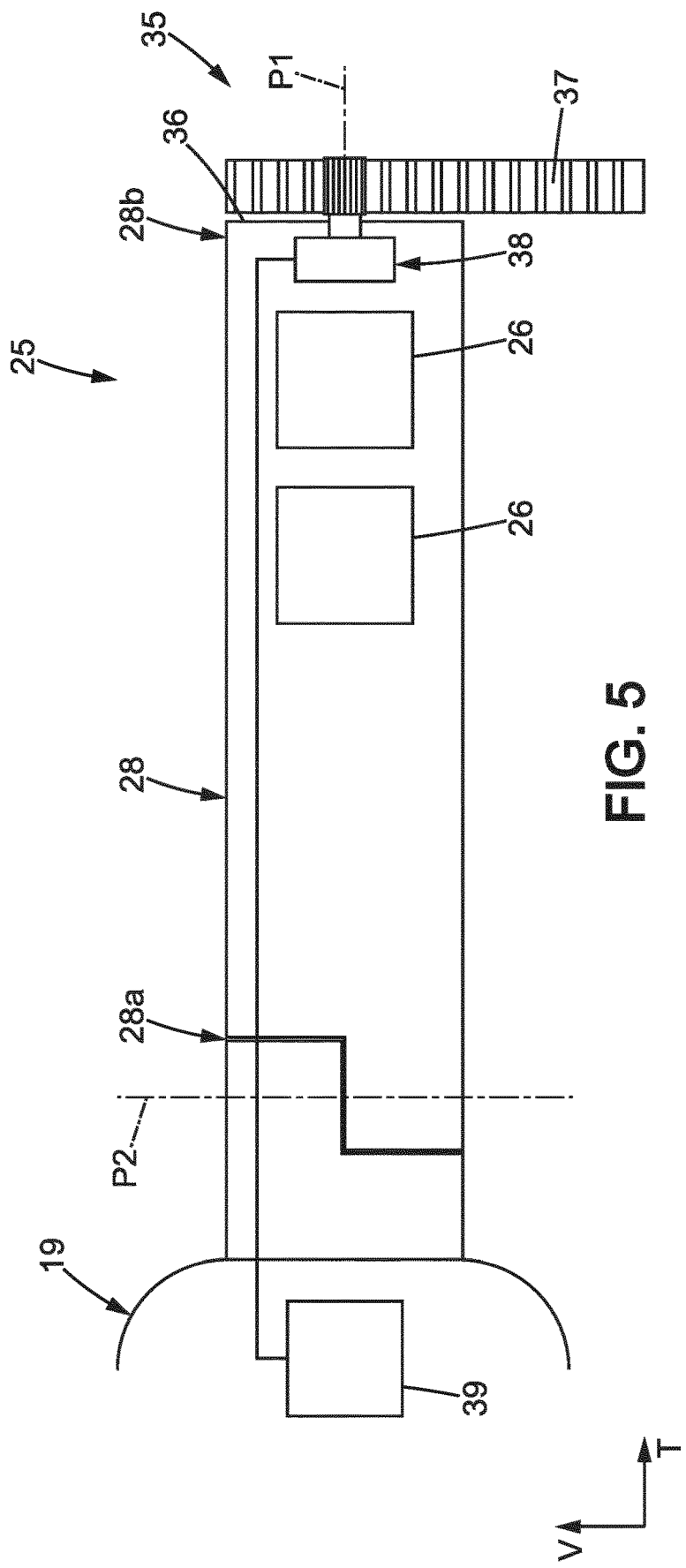
FIG. 5 is an enlarged representation of the detail referenced A on FIG. 1, illustrating the side clearance device comprising an actuator for moving the deflector and an electronic control unit for controlling the actuator.

The side clearance device 35 is represented in more details in FIG. 5.

In FIG. 5, in the first embodiment, the deflector 37 is pivotally movable about a pivot axis P1 substantially parallel to the transverse direction T so that:
in the extended configuration, the deflector 37 extends substantially parallel to the vertical direction V with at least one portion of sufficient length directed towards the ground surface S to be visible through the lateral window 21, and
in the retracted configuration, the deflector extends rearward, substantially parallel to the ground surface S.

In addition, in the first embodiment, the deflector 37 is moved in an automated manner through the implementation of an actuator 38, such as an electric motor in the represented first embodiment, mechanically coupled to the deflector 37, and an electronic control unit 39 configured to control the actuator 38. Alternatively, the actuator 38 could be of any other suitable kind.

The deflector 37 may be removably mounted to the actuator 38. Preferably, the deflector 37 may be separated from the actuator 38 in a reversible manner, the deflector 37 being then mounted to the actuator through a reversible fastening arrangement. For example, the reversible fastening arrangement may comprise a fitting of any suitable kind, especially male/female, between the deflector 37 and the actuator 38, especially a shaft in case of an electric motor as actuator 38. This is advantageous in case the deflector is damaged as it would enable an easy replacement of the deflector only or if the driver does not wish to use such a device on the wings.

The electronic control unit 39 may be connected to a switch arranged on a front control panel 16 inside the driver compartment 4 to be actuated directly by the driver 9 to move the deflector 37 depending on the driving situation.

Alternatively or in a complementary manner, the electronic control unit 39 may be configured to detect at least one of an exiting situation in which the driver 9 exits the driver compartment 4 and an entering situation in which the driver 9 enters the driver compartment 4. The electronic control unit 39 may then be configured to control the actuator 38 so as to:

move the deflector 37 from the extended configuration to the retracted configuration upon detection of the exiting situation, before the door 20 has reached the open position, move the deflector 37 from the retracted configuration to the extended configuration upon detection of the entering situation, after the door 20 has been moved from the open position.

For example, the electronic control unit 39 may be configured to detect a position of the door 20 in the door swept B between the open position and the closed position. In the exiting situation, presence of the driver 9 in the driver compartment 4 and opening of the door 20 being detected, the electronic control unit 39 controls the actuator 38 to move the deflector 37 from the extended configuration to the retracted configuration as soon as a triggering position of the door 20 with respect to the deflector 37 is reached, before the door 20 is in the open position to avoid collision between the door 20 and the deflector 37. In the entering situation, presence of the driver 9 in the driver compartment 4 and closing of the door 20 being detected, the electronic control unit 39 controls the actuator 38 to move the deflector 37 from the retracted configuration to the extended configuration as soon as the triggering position is reached, after the door 20 has been moved from the open position. The triggering position is different from the open position and different triggering positions could be envisioned for exiting and entering situations.

Alternatively or in a complementary manner, the electronic control unit 39 may be configured to detect, effective or forthcoming, actuation of the door handle 22. Detection of effective or forthcoming actuation of the door handle 22 can be performed through a suitable sensor, for example a capacitive sensor, able to deliver a corresponding signal upon contact or proximity of a hand of the driver 9 with the door handle 22. Other sensors, such as optic sensor or force sensors, could be otherwise implemented. In the exiting situation, presence of the driver 9 in the driver compartment 4 being detected, the electronic control unit 39 controls the actuator 38 to move the deflector 37 from the extended configuration to the retracted configuration as soon as the driver 9 actuates the door handle 22 or is about to actuate the door handle 22 from inside the driver compartment 4. In the entering situation, presence of the driver 9 outside the driver compartment 4 being detected, the electronic control unit 39 controls the actuator 38 to move the deflector 37 from the extended configuration to the retracted configuration as soon as the driver 9 actuates the door handle 22 or is about to actuate the door handle 22 from outside the driver compartment 4.

Alternatively or in a complementary manner, the electronic control unit 39 may be configured to detect vehicle speed. The electronic control unit 39 controls the actuator 38 so as to place the deflector 37 in the retracted configuration when the vehicle speed is above a vehicle speed retraction threshold. The electronic control unit 39 may also be configured to control the actuator 38 so as to place the deflector 37 in the extended configuration when the vehicle speed is below a vehicle speed extension threshold.

Also in FIG. 5, the wing 28 is represented with its first end 28a mounted to the lateral frame 19 in an articulated manner so that the wing 28 may pivot about an axis P2 substantially parallel to the vertical direction V between a driving position, in which the wing 28 extends away from the driver compartment 4, substantially along the transverse direction T, and at least one folded position in which the wing 28 is brought close to the driver compartment 4 of the vehicle 1 substantially along the longitudinal direction L. Alternatively, the wing 28 may be fixed with respect to the lateral frame 19.

Besides, in addition to the camera 26 acquiring the lateral rear view, the wing 28 may support an additional camera 26. For example, one of the cameras 26 can be a main rear view camera, as known as class II camera according to the UN Regulation No. 46, and the other camera 26 may be a wide angle view camera, as known as class IV camera according to the UN Regulation No. 46. Alternatively, one of the cameras 26 can combine both main rear (class II according to the UN Regulation No. 46) and wide angle (class IV camera according to the UN Regulation No. 46) views, while the other camera 26 may be a close-proximity view camera, as known as class V camera according to the UN Regulation No. 46).

Alternatively, one camera can also combine the field of view of several cameras as for example combine the field of view of class IV and class V cameras or class V and class VI cameras.

In relation with FIGS. 4a and 4b, illustrating direct vision of the driver 9 seated on the driving seat 8 of the driver compartment 4, a method for manoeuvring the vehicle 1 implementing the side clearance device 35 is disclosed.

On FIG. 4a, the driver 9 is in the driver compartment 4 and the deflector 37 in the extended configuration is directly visible by the driver 9 from its driving seat 8 through the lateral window 21. The driver 9 may be manoeuvring the vehicle 1 at low speeds, below the vehicle speed extension threshold, requiring a visual reference to locate the vehicle side 18 as well as the second end 28b of the wing 28 with respect to obstacles of the surroundings. The vehicle 1 may then be stopped.

In FIG. 4b, as the exiting situation occurs, including both the intention of the driver 9 to exit the driver compartment 4 and the driver 9 effectively leaving the driver compartment 4, the deflector 37 is moved from the extended configuration to the retracted configuration in which it is located outside the door swept B. As previously explained, this can be accomplished by a direct actuation by the driver 9 of the switch on the front control panel 16 inside the driver compartment 4. It can also be accomplished in an automated manner based on detection of the triggering position of the door 20 and/or detection of actuation of the door handle 22.

In such situation, should the display 27 of the viewing system 25 be off, the electronic control unit 39 may be further configured to turn on the display 27 to provide the driver 9 with the lateral rear view of the camera 26, of which field of view has remained unchanged, before the driver 9 exits the driver compartment 4.

After the driver 9 has left the driver compartment 4 and as he comes back to the vehicle 1, the deflector 37 may have remained in the retracted configuration. If, however, the deflector 37 is in the extended configuration, it is moved to the retracted configuration before the door 20 is moved towards the open position, for example based on detection of the triggering position of the door 20 and/or detection of actuation of the door handle 22.

As the driver 9 enters the driver compartment 4, the deflector 37 is moved from the retracted configuration to the extended configuration based on at least one of actuation by the driver 9 of the switch on the front control panel 16 inside the driver compartment 4, detection of the triggering position of the door 20 and detection of actuation of the door handle 22.

After the driver 9 has started the vehicle 1 and reached a sufficient speed, above the vehicle speed retraction threshold, the deflector 37 may be moved to the retracted configuration.

The invention has been disclosed in relation with a deflector 37 actuated in an automated manner by the actuator 38 and the electronic control unit 39. In an alternative, actuation of the deflector 37 could be semi-automatic, the deflector 37 being moved from the extended configuration to the retracted configuration by a contact with the door itself, the actuator 38 only returning the deflector 37 towards the extended configuration. In a further alternative, actuation of the deflector 37 could be fully mechanical, the deflector 37 being pivotally mounted to the second end 28b of the wing 28 and moved by the contact of the door 20 when opening or closing the door 20. An elastic return member could be provided to resiliently urge the deflector 37 towards the extended configuration.

Also, any other suitable arrangement of the deflector 37 with its extended configuration enabling the driver 9 to locate the second end 28b of the wing 28 could be provided. For example, the support 36 could be arranged on a free end of an arm of the side clearance device 35, separate from the wing 28, the arm being mounted on the lateral frame 19 so that its free end is substantially at a same distance from the vehicle side 18 as that of the second end 28b of the wing 28.

Besides, the deflector 37 could be mounted on the support 36 through any other suitable fastening arrangement, implementing one or several pivot axis or other, so as to be movable between the extended and retracted configurations.

Figure 6:
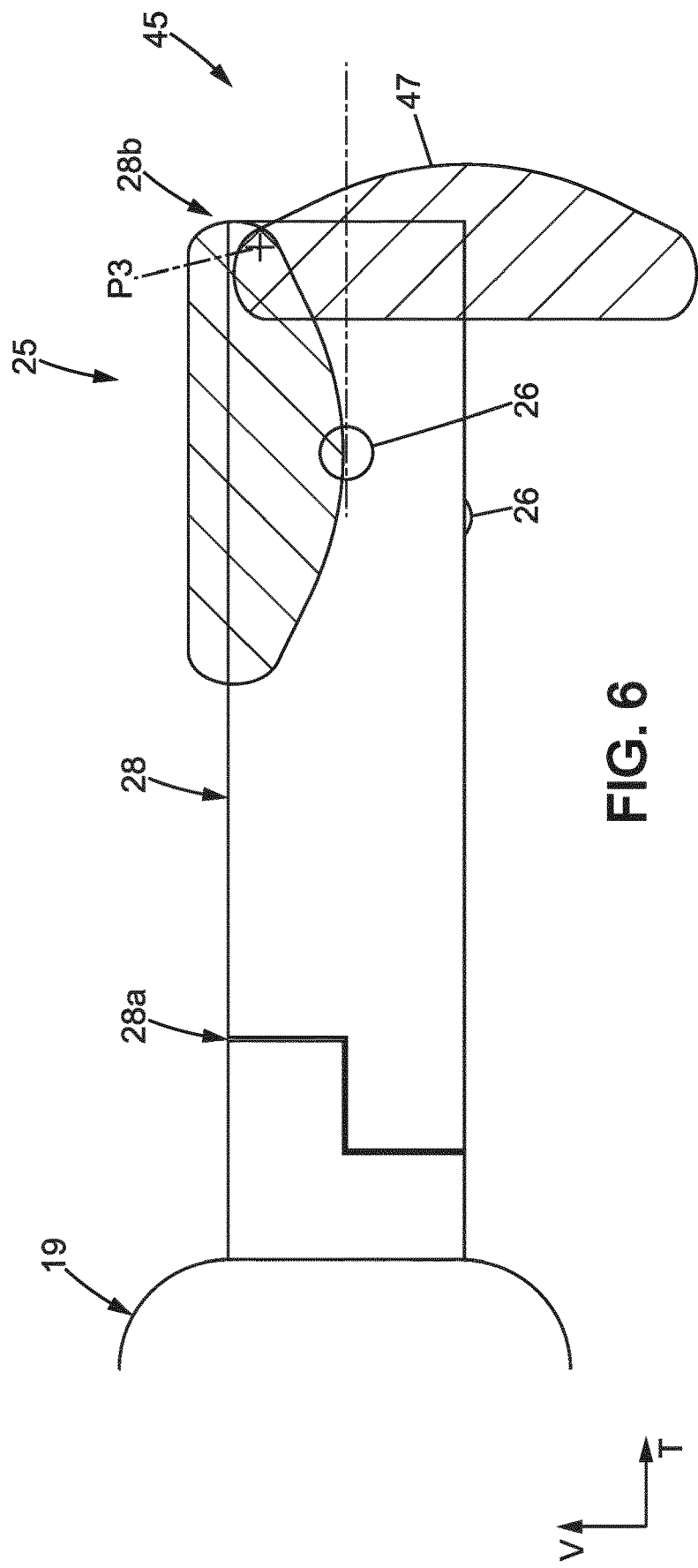
FIG. 6 is an enlarged representation of a side clearance device according to a second embodiment of the invention, the deflector being pivotally movable between the extended and retracted configurations about a pivot axis substantially parallel to a longitudinal direction of the vehicle, the deflector covering at least partly the camera in the retracted configuration.

For example, a side clearance device 45 according to a second embodiment of the invention is represented in FIG. 6. The second embodiment differs from the first embodiment in that the deflector 47 is pivotally movable between the extended and retracted configurations about a pivot axis P3 substantially parallel to the longitudinal direction L of the vehicle 1.

In addition, the deflector 47 is configured to cover at least partly the camera 26 providing the lateral rear view in the retracted configuration. Such provision enables the camera 26 to be protected against soiling or from the sun. Thanks to the movement imparted to the sole deflector 47, the actuator may be better responsive and move rapidly the deflector 47. Hence, in the exiting situation, the camera 26 may provide the lateral rear view for a sufficient time before being partly covered by the deflector 47 to allow the driver 9 to exit safely.

Figure 7A:
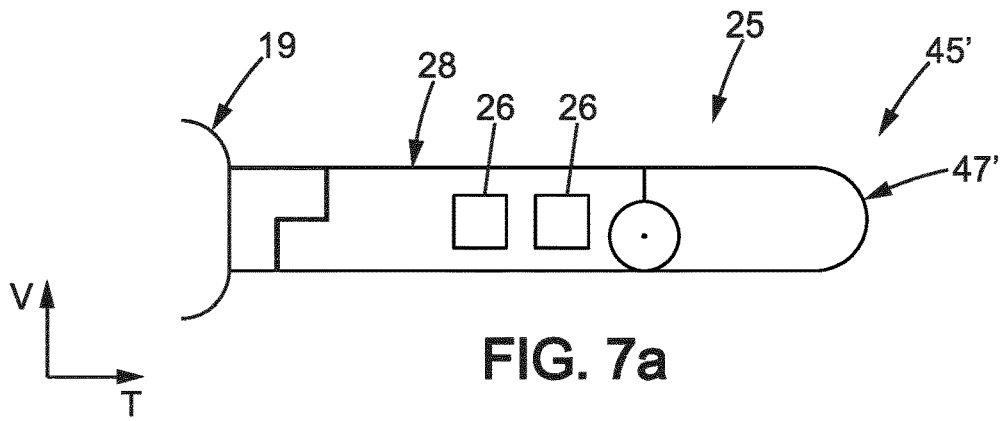
FIGS. 7a and 7b are enlarged representations of a side clearance device according to a first variant of the second embodiment of the invention, the deflector being respectively in the retracted and extended configurations.
Figure 7B:
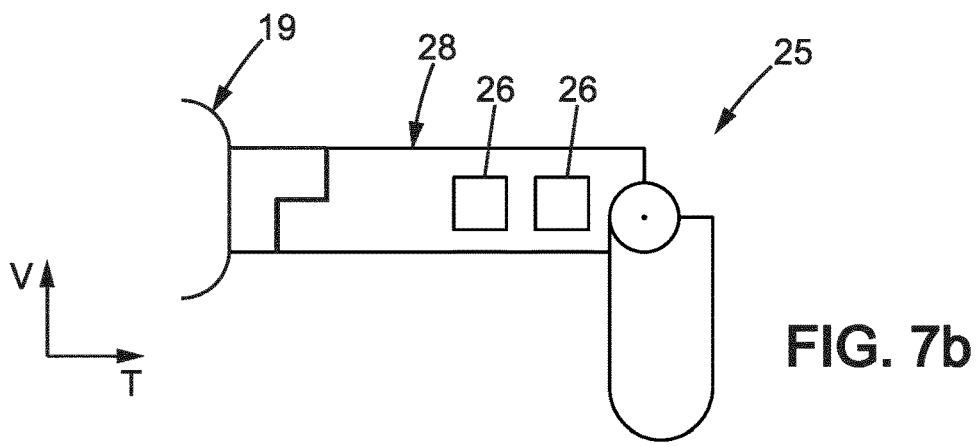

FIGS. 7a and 7b represent a side clearance device 45' according to a first variant of the second embodiment. The first variant differs from the second embodiment of FIG. 6 in that the deflector 47' in the retracted configuration shown on FIG. 7a is aligned with the wing 28.

Figure 8A:
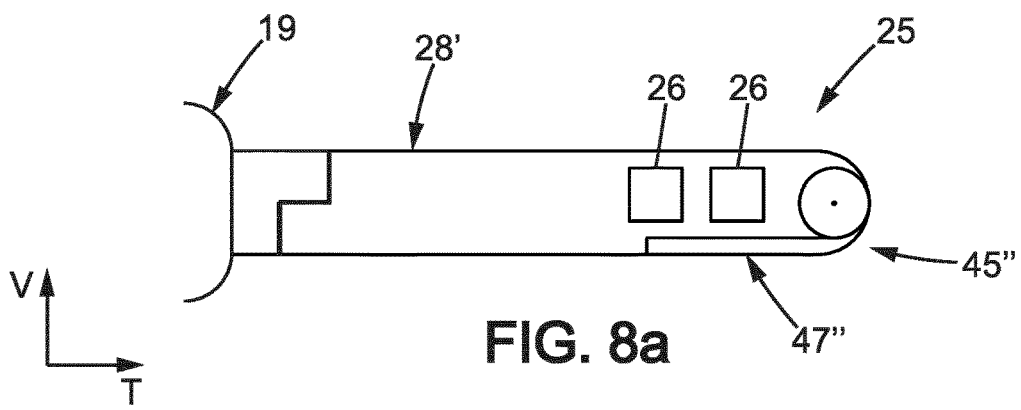
FIGS. 8a and 8b are enlarged representations of a side clearance device according to a second variant of the second embodiment of the invention, the deflector being respectively in the retracted and extended configurations.
Figure 8B:
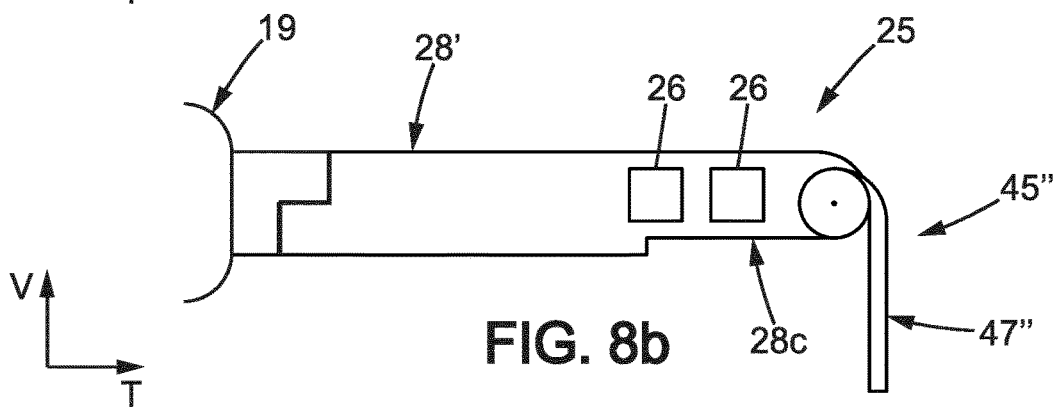

FIGS. 8a and 8b represent a side clearance device 45" according to a second variant of the second embodiment. The second variant differs from the second embodiment of FIG. 6 in that an end portion of the wing 28' close to the second end 28b is provided with a reservation 28c receiving the deflector 47" in the retracted configuration, as shown on FIG. 8a.

Figure 9:
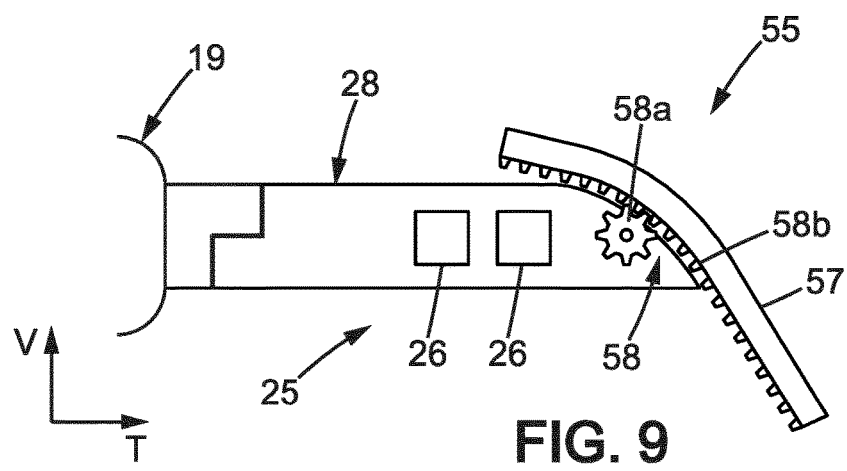
FIG. 9 is an enlarged representation of a side clearance device according to a third embodiment of the invention, the deflector being movable between the extended and retracted configurations along a translation path belonging to a plane substantially normal to the longitudinal direction.

A side clearance device 55 according to a third embodiment of the invention is represented on FIG. 9. The third embodiment differs from the first embodiment in that the deflector 57 is movable between the extended and retracted configurations along a translation path belonging to a plane substantially normal to the longitudinal direction L. In particular, the side clearance device 55 comprises an actuator 58 comprising a teethed pinion 58a driven in rotation and engaged with a curved teethed rack 58b to define a circular translation. Alternatively, a straight teethed rack extending substantially along the vertical direction V could be provided.

Figure 10:
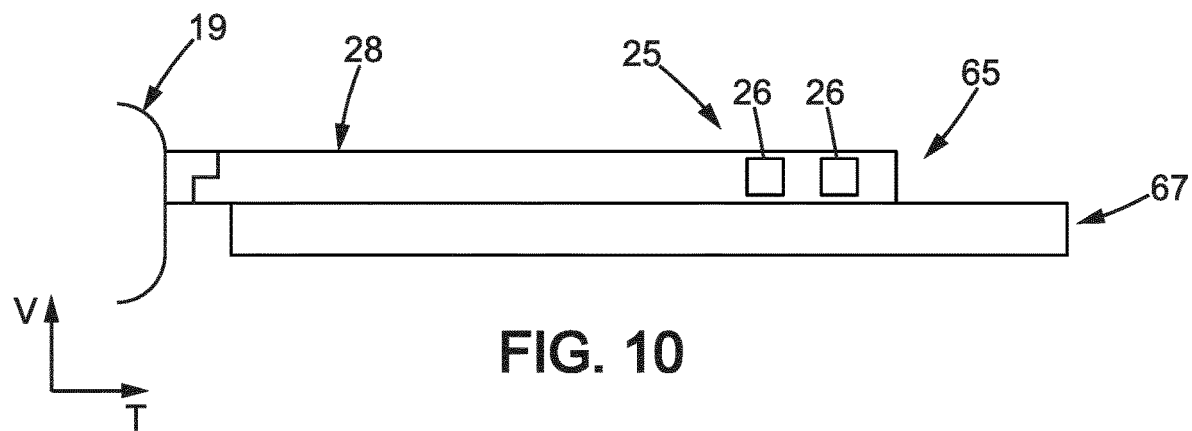
FIG. 10 is an enlarged representation of a side clearance device according to a fourth embodiment of the invention, the deflector being movable between the extended and retracted configurations by thermally induced deformation.

FIG. 10 represents a side clearance device 65 according to a fourth embodiment of the invention. The deflector 65 is made of a thermally deformable material and a heater is provided as actuator to move the deflector 65 between the extended and retracted configurations by thermally induced deformation.

Advantageously, the deflector 37 may also include additional devices to further improve the driving conditions such as lighting to support maneuvers at night, side blikers, position lights, etc. . . . .

The invention claimed is:

1. A vehicle comprising:
   a driver compartment extending along a longitudinal direction with a driving seat for a driver,
   two vehicle sides delimiting the driver compartment in a transverse direction, at least one of the vehicle sides comprising a lateral frame,
   a door pivotally mounted on the lateral frame along a door swept between an open position and a closed position, the door comprising a lateral window,
   a viewing system configured to image vehicle surroundings, the viewing system comprising:
      a wing configured to protrude outwardly from the lateral frame, the wing comprising a first end mounted on the lateral frame and a second end opposite to the first end, and
      at least one camera mounted on the wing so as to acquire a lateral rear view of the vehicle,
   a side clearance device comprising a support mounted on the lateral frame at a distance from the vehicle side, and a deflector mounted on the support and presenting an extended configuration in which the deflector is directly visible from the driving seat through the lateral window so as to enable the driver to locate the second end of the wing, the vehicle being characterized in that the deflector is movable with respect to the support between the extended configuration and a retracted configuration in which the deflector is arranged outside of the door swept, an actuator configured to move the deflector, and
an electronic control unit configured to control the actuator,
wherein the electronic control unit is configured to detect at least one of an exiting situation in which the driver exits the driver compartment, and an entering situation in which the driver enters the driver compartment, the electronic control unit is configured to control the actuator so as to:
move the deflector from the extended configuration to the retracted configuration upon detection of the exiting situation, before the door has reached the open position,
move the deflector from the retracted configuration to the extended configuration upon detection of the entering situation, after the door has been moved from the open position.

2. The vehicle of claim 1, wherein the support is arranged at the second end of the wing.

3. The vehicle of claim 1, wherein the electronic control unit comprises a switch arranged inside the driver compartment so as to be actuated by the driver to move the deflector in one of the extended and retracted configurations.

4. The vehicle of claim 1, wherein the electronic control unit is configured to detect a position of the door in the door swept between the open position and the closed position, the electronic control unit controlling the actuator so as to move the deflector based on detection of a triggering position reached by the door with respect to the deflector.

5. The vehicle of claim 1, wherein the door further comprises a door handle that can be actuated by the driver to move the door from the closed position to the open position, the electronic control unit controlling the actuator so as to move the deflector based on detection of actuation of the door handle.

6. The vehicle of claim 1, wherein the viewing system further comprises a display placed in the driver compartment and configured to display the lateral rear view acquired by the camera, and the electronic control unit is further configured to enable turn on the display upon detection of the exiting situation.

7. The vehicle of claim 1, wherein the electronic control unit is configured to detect vehicle speed and to control the actuator so as to place the deflector in the retracted configuration when the vehicle speed is above a vehicle speed retraction threshold.

8. The vehicle of claim 7, wherein the electronic control unit is configured to control the actuator so as to place the deflector in the extended configuration when the vehicle speed is below a vehicle speed extension threshold.

9. The vehicle of claim 1, wherein the deflector is pivotally movable about at least one pivot axis, the pivot axis being one of:
substantially parallel to the longitudinal direction, and
substantially parallel to the transverse direction.

10. The vehicle of claim 1, wherein the deflector is movable along a translation path belonging to a plane substantially normal to the longitudinal direction.

11. The vehicle of claim 1, wherein the side clearance device is configured so that the deflector covers at least partly the camera in the retracted configuration.

12. The vehicle of claim 1, wherein the lateral frame comprises a roof part above a lateral access closed by the door in the closed position, the wing and the deflector being mounted on the roof part.

13. A method for manoeuvring the vehicle of claim 1, comprising:
moving a deflector of a side clearance device with respect to a support mounted on a lateral frame of the vehicle at a distance from a vehicle side, the deflector moving between an extended configuration in which the deflector is directly visible from a driving seat of a driver compartment through a lateral window of a door pivotally mounted on the lateral frame so as to enable the driver to locate the second end of the wing, and a retracted configuration in which the deflector is arranged outside of a door swept of the door between an open position and a closed position, and
detecting at least one of an exiting situation in which the driver exits the driver compartment, and an entering situation in which the driver enters the driver compartment, and at least one of:
moving the deflector from the extended configuration to the retracted configuration upon detection of the exiting situation, before the door has reached the open position, and
moving the deflector from the retracted configuration to the extended configuration upon detection of the entering situation, after the door has been moved from the open position.

14. The method of claim 13, comprising moving the deflector in one of the extended and retracted configuration upon actuation of a switch arranged inside the driver compartment by the driver.

15. The method of claim 13, comprising detecting a position of the door in the door swept between the open position and the closed position and moving the deflector based on detection of a triggering position reached by the door with respect to the deflector.

16. The method of claim 13, wherein the door further comprises a door handle that can be actuated by the driver to move the door from the closed position to the open position, the method comprising moving the deflector based on detection of actuation of the door handle.

17. The method of claim 13, wherein the viewing system further comprises a display placed in the driver compartment and configured to display the lateral rear view acquired by the camera, the method comprising turning on the display upon detection of the exiting situation.

18. The method of claim 13, comprising detecting vehicle speed and placing the deflector in the retracted configuration when the vehicle speed is above a vehicle speed retraction threshold.

19. The method of claim 18, comprising placing the deflector in the extended configuration when the vehicle speed is below a vehicle speed extension threshold.

20. The vehicle of claim 1, comprising a support configured to be mounted on a lateral frame of the vehicle at a distance from a vehicle side, and a deflector mounted on the support and movable with respect to the support between an extended configuration in which the deflector is configured to be directly visible from a driving seat of a driver compartment through a lateral window of a door pivotally mounted on the lateral frame so as to enable the driver to locate a second end of a wing of a viewing system, and a retracted configuration in which the deflector is configured to be arranged outside of a door swept of the door between an open position and a closed position.

21. The vehicle of claim 20 and a wing configured to protrude outwardly from the lateral frame, the wing comprising a first end mounted on the lateral frame and a second end opposite to the first end, the support being arranged at the second end of the wing.

22. The vehicle of claim 21, further comprising at least a camera mounted on the wing and configured to acquire a lateral rear view of the vehicle.

\* \* \* \* \*